(12) United States Patent
Thebault et al.

(10) Patent No.: US 9,809,201 B2
(45) Date of Patent: Nov. 7, 2017

(54) WINDSCREEN WIPER

(71) Applicant: Valeo Systèmes d'Essuyage, Le Mesnil Saint Denis (FR)

(72) Inventors: Denis Thebault, Clermont Ferrand (FR); Xavier Bousset, Mezel (FR); Giuseppe Grasso, Le Breuil sur Couze (FR); Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 196 days.

(21) Appl. No.: 14/308,218

(22) Filed: Jun. 18, 2014

(65) Prior Publication Data
US 2014/0373299 A1 Dec. 25, 2014

(30) Foreign Application Priority Data
Jun. 19, 2013 (FR) ...................... 13 55806

(51) Int. Cl.
*B60S 1/38* (2006.01)

(52) U.S. Cl.
CPC .......... *B60S 1/3877* (2013.01); *B60S 1/3808* (2013.01); *B60S 1/3848* (2013.01); *B60S 1/3881* (2013.01); *B60S 1/381* (2013.01); *B60S 2001/382* (2013.01); *B60S 2001/3812* (2013.01)

(58) Field of Classification Search
CPC ...... B60S 1/3877; B60S 1/3881; B60S 1/381; B60S 1/3875; B60S 1/3848; B60S 1/3874; B60S 1/3882; B60S 1/38
USPC .......... 15/250.43, 250.361, 250.451, 250.44
See application file for complete search history.

(56) References Cited

U.S. PATENT DOCUMENTS

| 3,427,637 A * | 2/1969 | Quinlan ............... B60S 1/3801 |
| | | 15/250.451 |
| 2008/0295273 A1* | 12/2008 | Lin ....................... B60S 1/381 |
| | | 15/250.452 |
| 2011/0113580 A1* | 5/2011 | Caillot ................. B60S 1/3862 |
| | | 15/250.01 |

(Continued)

FOREIGN PATENT DOCUMENTS

| CN | 102414061 A | 4/2012 | |
| CN | 103129528 A | 6/2013 | |
| DE | EP 2596999 A2 * | 5/2013 | ............ B60S 1/3881 |

(Continued)

OTHER PUBLICATIONS

EP2596999A2 (machine translation), 2013.*
The First Office Action issued in corresponding Chinese Application No. 201410392533.9, dated Aug. 11, 2017 (19 pages).

*Primary Examiner* — Andrew A Hornton
(74) *Attorney, Agent, or Firm* — Osha Liang LLP

(57) ABSTRACT

The invention relates to a support fitting (10) for a windscreen wiper, the said fitting (10) comprising a body with a longitudinal direction of extension (X), the said body comprising first means which are designed to receive a bending vertebra (20) and second means which define an open lower receptacle (13) for receipt of an upper heel for fitting of a wiping blade of the wiper, characterized in that the said second means comprise recesses (52) which facilitate the bending of the said vertebra (20).

Figure 1:
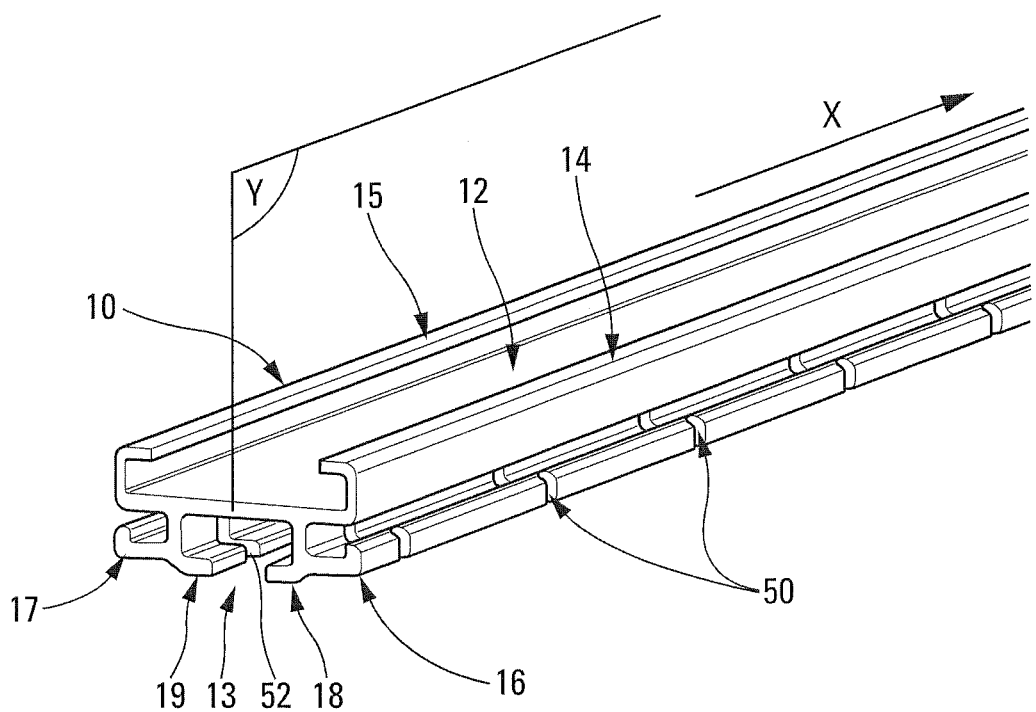

The invention also relates to a windscreen wiper comprising a fitting (10) of this type. The invention also relates to a wiping system comprising a wiper of this type.

8 Claims, 2 Drawing Sheets

(56) References Cited

U.S. PATENT DOCUMENTS

2013/0269142 A1\* 10/2013 Egner-Walter ............ B60S 1/38
15/250.32
2014/0352096 A1\* 12/2014 Grasso .................. B60S 1/3805
15/250.06

FOREIGN PATENT DOCUMENTS

| FR | 2963595 A1 | | 2/2012 | |
|----|-----------|---|--------|---|
| FR | DE 102010056462 | \* | 7/2012 | ................ B60S 1/38 |
| KR | WO 2007142390 A1 | \* | 12/2007 | ................ B60S 1/38 |
| WO | 2006117081 A1 | | 11/2006 | |

\* cited by examiner

WINDSCREEN WIPER

The field of the present invention is that of equipment for vehicles, and more particularly that of equipment for wiping windows of motor cars.

Motor cars are currently equipped with windscreen wiper systems in order to ensure washing of the windscreen, and prevent the view which the driver has of his environment from being disrupted. These windscreen wipers are conventionally driven by arms or wiper holders which perform an angular to-and-fro movement, and comprise elongate wipers, which themselves hold scraper blades made of a resilient material. These blades rub against the windscreen and discharge water, taking it outside the field of vision of the driver. The wipers are made in the form either, in a conventional version, of articulated rocking levers which hold the scraper blade in several discrete locations, or, in a more recent version known as a flat blade, in the form of a semi-rigid assembly which retains the scraper blade along its entire length.

Patent application FR2963595A1 discloses a windscreen wiper comprising a support fitting with a longitudinal main orientation, and a wiping blade which is supported by the said fitting. The fitting comprises an upper tubular body containing a bending vertebra and an open lower receptacle containing an upper heel for fitting of the wiping blade. An aerodynamic deflector is secured on the said support fitting by being clipped into grooves provided laterally in the support fitting.

The upper tubular body, or upper receptacle, can be closed, as in patent application FR2963595A1. It is also known to make it substantially open according to the said longitudinal direction. This makes it possible to increase the flexibility of the support fitting. However, in the case of extreme climatic conditions, for example in severe cold weather, the opening provided in the upper receptacle of the support fitting is not sufficient to provide the said support fitting with the required flexibility.

The object of the invention is to propose a support fitting for a windscreen wiper, the flexibility of which is reinforced irrespective of the climatic environment of the windscreen wiper.

To this end, the subject of the invention is a support fitting for a windscreen wiper, the said fitting comprising a body with a longitudinal direction of extension, known as the longitudinal main orientation, the said body comprising first means which are designed to receive a bending vertebra, and second means which define an open lower receptacle for receipt of an upper heel for fitting of a wiping blade of the wiper.

According to the invention, the said second means comprise recesses which facilitate the bending of the said vertebra.

Thus, the support fitting has reinforced flexibility in the longitudinal direction and in torsion, relative to fittings which do not have recesses in the said second means, whether the upper receptacle of the said fitting is closed or open.

According to different embodiments of the invention, which can be taken together or separately:
  each of the said recesses passes through the thickness of the said second means;
  the said second means are longitudinal hooks, and the said recesses pass through the said hooks;
  the said hooks extend from a base of the said receptacle;
  the said first means define a receptacle, known as the upper receptacle, which is open at least partly in its middle, according to the said longitudinal direction of extension;
  the said upper receptacle has an upper part open without interruption along the entire length of the said fitting, preferably in its middle;
  the said first means are hooks, known as longitudinal hooks, with a direction of extension which is substantially parallel, preferably parallel to the said longitudinal direction of extension;
  the said upper receptacle and the said lower receptacle are separated by a common wall;
  the said fitting additionally comprises lateral fins which are designed to retain a deflector of the said wiper, each of the said fins comprising a securing harpoon which is designed to co-operate with a complementary harpoon provided on a branch of the said deflector;
  the said fins also comprise recesses which facilitate the bending of the said vertebra;
  each of the said recesses passes through the thickness of the said fins;
  each of the said recesses is produced in a direction which is substantially transverse, and in particular at right angles to the said longitudinal direction of extension;
  the said fitting is made of plastic material;
  the said fitting is made of polypropylene (PP);
  the said upper receptacle, in particular the said vertebra, can receive a heating element;
  the said heating element extends in the said longitudinal direction of extension, along the support fitting.

The fitting of the upper heel of the wiping blade in the fitting is easy and intuitive.

According to an aspect of the invention which can be used with all or part of the preceding characteristics, the said upper receptacle also comprises recesses.

According to different embodiments of this aspect of the invention, which can be taken together or separately:
  each of the said recesses is produced in a direction which is substantially transverse, in particular at right angles to the said longitudinal direction of extension;
  each of the said recesses passes through the thickness of the said upper receptacle;
  the said recesses form incomplete cut-outs in lateral walls of the said upper receptacle.

The said body is advantageously symmetrical relative to a plane of symmetry which belongs to the said body, the said plane of symmetry being oriented according to the said longitudinal direction of extension, such that the recesses in the second means, the fins and/or the said receptacle, are present on both sides of the said fitting.

The invention also relates to a windscreen wiper comprising a fitting such as described above, a bending vertebra and a wiping blade, and preferably also a deflector. In this case, it is preferably a wiper of the flat-blade type, i.e. without a rocking lever.

The invention also relates to a wiping system comprising a wiper of this type.

The invention will be better understood, and other objectives, details, characteristics and advantages of it will become more apparent during the following detailed explanatory description of at least one embodiment of the invention, provided purely by way of illustrative and non-limiting example, with reference to the appended schematic drawings.

Figure 2:
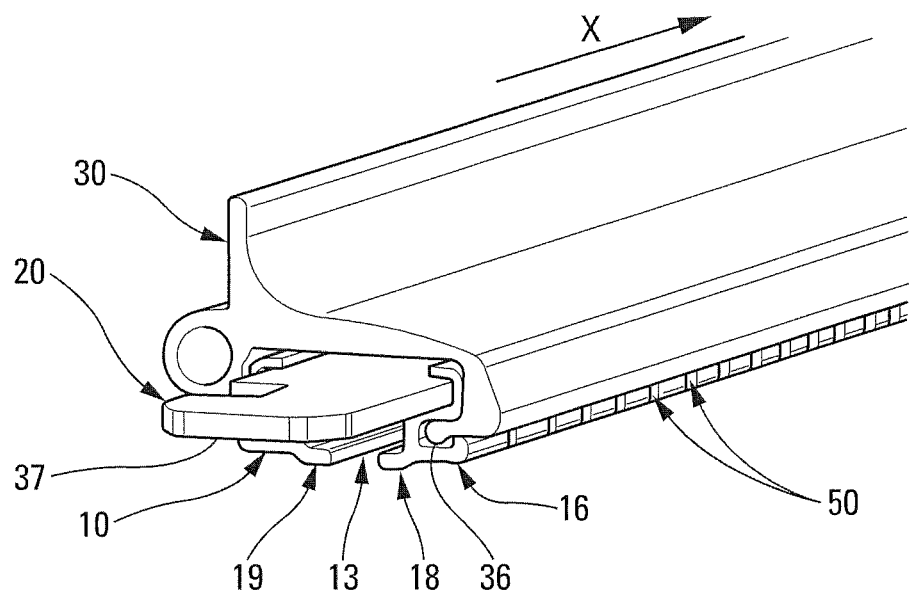
Figure 3:
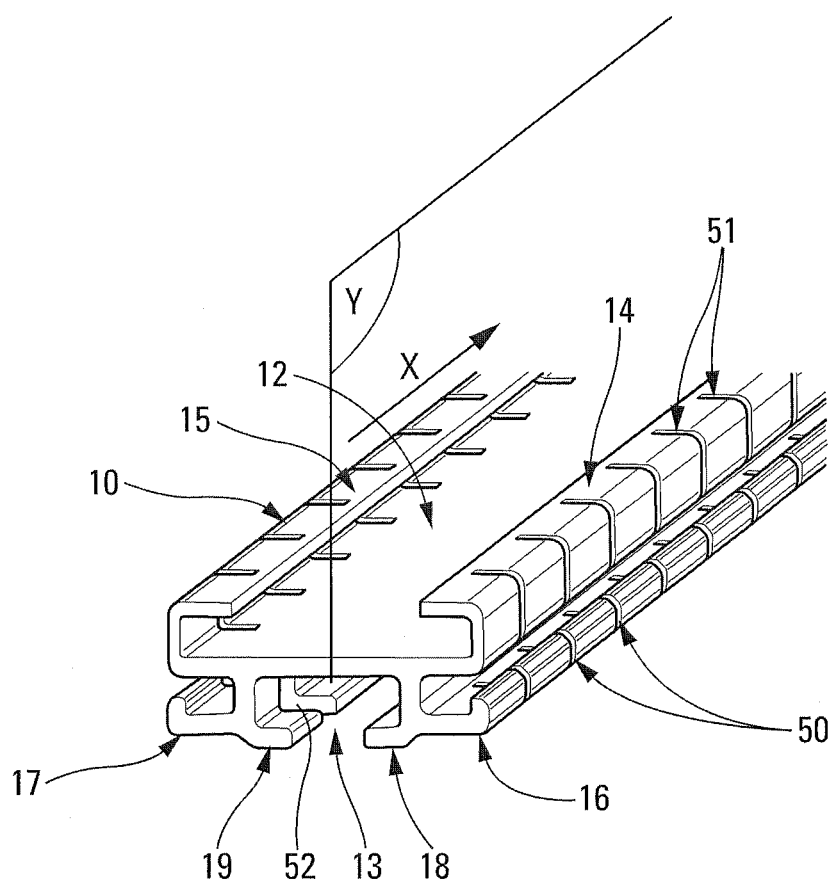

In these drawings:

FIG. 1 is a view in perspective of a first embodiment of a fitting according to the invention;

FIG. 2 incorporates FIG. 1, and makes it possible to see in addition a deflector and a vertebra of a windscreen wiper according to the invention;

FIG. 3 is a view in perspective of a second embodiment of a fitting according to the invention.

As illustrated in the different figures, the invention relates to a support fitting 10 for a windscreen wiper. The fitting 10 according to the invention comprises a body with a longitudinal main orientation. The said longitudinal orientation is also that of the windscreen wiper; it is indicated by the direction X in FIGS. 1 to 3. The body of the fitting 10 comprises first means which are designed to receive a bending vertebra 20. The bending vertebra 20 provides the rigidity necessary for pressing the windscreen wiper on a windscreen of a vehicle, and ensures that the wiping blade is retained along its entire length. The body of the fitting 10 also comprises second means which define an open lower receptacle 13 for receipt of an upper heel for fitting of a wiping blade of the wiper.

The first means which are designed to receive the bending vertebra 20 can be produced in different manners. They can be a closed upper receptacle which is designed to contain the bending vertebra 20. As illustrated, the upper receptacle 12 can also be open in its middle, according to the longitudinal direction of extension X. Preferably, the said upper receptacle 12 has an upper part which is open without interruption along the entire length of the said fitting 10. The said upper receptacle 12 then has lateral walls 14, 15 in the form of retention hooks for the vertebra 20. Advantageously, these hooks have a transverse cross-section substantially in the form of an "L" which is turned by 180° respectively clockwise and anticlockwise, and they are symmetrically opposed relative to a plane of symmetry Y of the said fitting 10. The said open upper part thus has a width smaller than the width of the upper receptacle 12, when these widths are measured on parallel planes.

The second means define the open lower receptacle 13 for receipt of the upper heel for fitting of a wiping blade of the wiper. The said wiping blade is not represented here, but is well known to persons skilled in the art.

The said second means are hooks 18, 19, known as longitudinal hooks, with a direction of extension substantially parallel to the said longitudinal direction of extension. In this case, they extend from a wall common to the upper 12 and lower 13 receptacles, a wall from which there also extend the said hooks for retention of the vertebra 20. Advantageously, these longitudinal hooks 18, 19 have a transverse cross-section substantially in the form of an "L", and are symmetrically opposite relative to a plane of symmetry Y of the said fitting 10. The said lower receptacle 13 then has a lower part which is open without interruption along the entire length of the said fitting 10. This open lower part has a width smaller than the width of the lower receptacle 13, when these widths are measured on parallel planes.

Although the support fitting 10 is designed to provide the wiper with rigidity, the said fitting 10 is also advantageously flexible. This is because it is also designed to adapt the pressing of the wiper according to the windscreen to be wiped.

The support fittings 10 according to the prior art do not have satisfactory flexibility in all circumstances. This is why, according to the invention, the said second means additionally comprise recesses which facilitate the bending of the said fitting 10.

The said recesses 52 can be seen in particular in FIGS. 1 and 3; they are produced in a direction which is substantially transverse to the said longitudinal direction of extension X. They are preferably regularly spaced relative to one another, and pass through the thickness of the said longitudinal hooks 18, 19. They will be known hereinafter as the first recesses 52.

The said fitting can also comprise lateral fins 16, 17 which are designed to retain the aerodynamic deflector 30 of the said wiper. These lateral fins 16, 17 each comprise a securing harpoon which is designed to co-operate with a complementary harpoon provided on a branch 36, 37 of the said deflector 30. In this case, the said lateral fins 16, 17 extend parallel to a lower edge of the retention hooks 14, 15 of the vertebra 20.

It can also be determined from all of the figures that the said lower receptacle 13 is situated opposite the upper receptacle 12, relative to the said lateral fins 16, 17. In other words, the upper receptacle 12 and the lower receptacle 13 are separated by a common wall. In this case, the lateral fins extend from a lateral edge of the said longitudinal hooks 18, 19 which define the second lower receptacle 13.

In addition, recesses 50 can be provided in the fins 16, 17. These recesses 50, which can be seen in all the figures, will be produced such as to complement the first recesses 52 provided in the longitudinal hooks 18, 19. They will be known hereinafter as the second recesses 50.

The said second recesses 50 pass through the thickness of the said fins 16, 17, and can be situated on the same plane as the first recesses 52, or at least some of them.

Thus, the fitting according to the invention has reinforced flexibility, firstly thanks to the opening in the first receptacle, known as the upper receptacle 12, and secondly, thanks to the first recesses 52 provided regularly along the longitudinal hooks 18, 19 and to the second recesses 50 provided along the lateral fins 16, 17. This provides a fitting 10 with greater flexibility.

In addition, the assembly of the support fitting 10 and the deflector 30 is facilitated. This is because this assembly is carried out firstly by clipping the branches 36, 37 of the deflector 30 inside the fins 16, 17, then by mutual sliding.

The second recesses 50 provided in the fins 16, 17 which are designed to retain the deflector 30 make it possible to reduce the friction between these two elements, in particular during their assembly.

As can be seen in FIG. 3, in a second embodiment of the invention, the first and second recesses 50, 52 can be completed by recesses 51 provided in the lateral walls 14, 15 of the upper receptacle 12, in particular when the latter is open. These recesses 51 will be known hereinafter as the complementary recesses 51.

Just like the recesses 50, 52 provided in the longitudinal hooks 14, 15 and in the lateral fins 16, 17, the said complementary recesses 51 will be produced in a direction substantially transverse to the said longitudinal orientation X. In addition, they will pass through the thickness of the said upper receptacle 12.

In particular, the said complementary recesses 51 can form incomplete cut-outs in the lateral walls 14, 15 of the upper receptacle 12. In other words, the cut-outs 51 leave material at their ends, along the free edges of the said retention hooks 14, 15 of the vertebra.

It can be noted that the complementary recesses 51 can also be provided in the lateral walls of the upper receptacle 12, even if the latter is closed (embodiment not represented).

The said complementary recesses 51 are preferably regularly spaced from one another, for example according to the same spacing as the first and/or second recesses 50, 52 provided in the longitudinal hooks 14, 15 and/or in the lateral fins 16, 17.

The complementary recesses 51 can be situated on the same plane as the said first and/or second recesses 50, 52, or at least some of them.

Thus, the fitting according to the invention will have flexibility which is increased further still, firstly thanks to the opening in the first receptacle, known as the upper receptacle 12, and secondly thanks to the recesses 50, 51, 52 provided regularly along the longitudinal hooks 18, 19 and/or along the lateral fins 16, 17 and along the lateral walls of the upper receptacle 12. This will provide a fitting 10 which is flexible in the longitudinal direction X, but is also flexible in torsion.

A plane of symmetry Y is represented in the figures. Virtually, this plane of symmetry Y is that relative to which the body of the said fitting 10 is obtained. It can thus be understood that the said first and second recesses 50, 52 as well as any complementary recesses 51 are situated opposite one another on both sides of the said plane of symmetry Y.

It will be preferable to make the support fitting 10 in plastic material, although any other material is possible, for example a metal material. In the present case, the recesses 50, 51, 52 can easily be produced during the making of the said fitting 10, in a plastic material of the polypropylene (PP) type.

It will be noted that variant embodiments are clearly possible. In particular it is also possible, in an additional embodiment, for the upper receptacle 12 or the said vertebrae 20 to be able to receive a heating element (embodiment not represented). In this embodiment, the said heating element would be such that it would extend in the longitudinal direction of extension X along the support fitting 10.

Irrespective of the embodiment, the preferred application of the above described invention will be for the windscreen wipers of wiping systems for motor vehicles.

The invention claimed is:

1. A support fitting for a windscreen wiper, the fitting comprising:
    a body elongated in a longitudinal direction, the body comprising first means for receiving a bending vertebra, the first means defining an upper receptacle, and second means which define an open lower receptacle for receipt of an upper heel for fitting of a wiping blade of the wiper; and
    lateral fins for retaining a deflector of the wiper, each of the fins comprising a securing harpoon for cooperating with a complementary harpoon provided on a branch of the deflector,
    wherein the second means comprise two L-shaped longitudinal hooks with a direction of extension that is substantially parallel to the longitudinal direction,
    wherein the second means comprise first recesses which facilitate the bending of the vertebra,
    wherein each securing harpoon comprises an upper wall, which is substantially perpendicular to a lower wall of the securing harpoon,
    wherein the first means comprises sidewalls,
    wherein each sidewall comprises an upper wall and a lower wall, the upper wall being directly connected to the lower wall, the sidewalls being directly connected to each other by a base wall, the upper wall defining a free end of the sidewall, the upper wall being substantially perpendicular to the lower wall and substantially parallel to the base wall, and the upper walls being spaced apart from each other by an open space in a lateral direction which is perpendicular to the longitudinal direction, each longitudinal hook comprising an upper wall and a lower wall, the upper wall of the hook being directly connected to the lower wall of the hook, the lower wall of the hook being substantially perpendicular to the upper wall of the hook and substantially parallel to the base wall, the lower walls of the hooks being spaced apart from each other by an open space in the lateral direction, and
    wherein the entirety of each sidewall is above the base wall, the entirety of each hook is below the base wall, and the entirety of each securing harpoon is below the base wall.

2. The fitting according to claim 1, wherein the first means are longitudinal hooks with a direction of extension which is substantially parallel to the longitudinal direction.

3. The fitting according to claim 1, wherein the fins comprise second recesses which facilitate the bending of the vertebra.

4. The fitting according to claim 3, wherein each of the first and second recesses is produced in a direction which is substantially transverse to the longitudinal direction.

5. The fitting according to claim 1, wherein the upper receptacle comprises complementary recesses, each of the complementary recesses being produced in a direction which is substantially transverse to the longitudinal direction, the complementary recesses passing through the thickness of the upper receptacle and forming incomplete cutouts in the sidewalls of the upper receptacle.

6. The fitting according to claim 1, wherein the body is symmetrical relative to a plane of symmetry which belongs to the body, the plane of symmetry being oriented according to the longitudinal direction.

7. A windscreen wiper comprising:
    the support fitting as defined in claim 1;
    the bending vertebra;
    the wiping blade; and
    the deflector.

8. A wiping system comprising the windscreen wiper as defined in claim 7.

* * * * *